United States Patent
Boutillier et al.

(10) Patent No.: US 9,546,268 B2
(45) Date of Patent: Jan. 17, 2017

(54) IMPACT-REINFORCED ACRYLIC MATERIAL

(75) Inventors: Jean-Marc Boutillier, Sauvagnon (FR); Jean-Pierre Disson, Vernaison (FR)

(73) Assignee: Arkema France, Colombes (FR)

(*) Notice: Subject to any disclaimer, the term of this patent is extended or adjusted under 35 U.S.C. 154(b) by 588 days.

(21) Appl. No.: 14/009,346

(22) PCT Filed: Apr. 5, 2012

(86) PCT No.: PCT/FR2012/050745
§ 371 (c)(1),
(2), (4) Date: Oct. 2, 2013

(87) PCT Pub. No.: WO2012/136941
PCT Pub. Date: Oct. 11, 2012

(65) Prior Publication Data
US 2014/0030538 A1    Jan. 30, 2014

(30) Foreign Application Priority Data

Apr. 7, 2011  (FR) .................... 11 01046

(51) Int. Cl.
| C08L 53/00 | (2006.01) |
| C08F 220/14 | (2006.01) |
| C08F 220/18 | (2006.01) |

(52) U.S. Cl.
CPC ............ *C08L 53/00* (2013.01); *C08F 220/14* (2013.01); *C08F 2220/1825* (2013.01); *C08L 2205/22* (2013.01); *Y10T 428/2495* (2015.01); *Y10T 428/31855* (2015.04); *Y10T 428/31928* (2015.04)

(58) Field of Classification Search
None
See application file for complete search history.

(56) References Cited

U.S. PATENT DOCUMENTS

| 3,345,434 A | 10/1967 | Griffith | |
| 5,247,019 A * | 9/1993 | Cozens | B29C 49/0005 524/515 |
| 6,878,436 B2 * | 4/2005 | Reilly | B32B 5/16 313/506 |
| 7,067,188 B1 * | 6/2006 | Yang | B29C 47/0004 428/327 |
| 7,667,188 B2 | 2/2010 | Tovar | |
| 8,475,915 B2 | 7/2013 | Delprat et al. | |
| 2001/0036543 A1 * | 11/2001 | Sparks | B32B 27/08 428/215 |
| 2005/0133950 A1 | 6/2005 | Eustace et al. | |
| 2007/0141339 A1 * | 6/2007 | Song | A61K 9/1635 428/402 |
| 2008/0242786 A1 * | 10/2008 | Garcia-Leiner | C08K 3/0033 524/423 |
| 2010/0010172 A1 * | 1/2010 | Hong | C08F 293/005 525/92 E |
| 2015/0175785 A1 * | 6/2015 | Lavallee | C08G 77/455 524/102 |

OTHER PUBLICATIONS

Leibler, L., "Theory of Microphase Separation in Block Copolymers" Macromolecules 1980, vol. 13, No. 6, p. 1602-1617, American Chemical Society.

Ruzette, A.V., et al, "Molecular Disorder and Mesoscopic Order in Polydisperse Acrylic Block Copolymers Prepared by Controlled Radical Polymerization", Macromolecules 2006, vol. 39, No. 17 p. 5804-5814, American Chemical Society.

* cited by examiner

*Primary Examiner* — Robert S Loewe
(74) *Attorney, Agent, or Firm* — Thomas F. Roland

(57) ABSTRACT

The subject of the present invention is a semi-rigid or flexible and low-gloss impact-reinforced acrylic material. The acrylic material according to the invention comprises a nanostructured matrix constituted of at least one thermoplastic acrylic block copolymer and at least one highly crosslinked acrylic copolymer. The matrix comprises at least one thermoplastic acrylic block copolymer. The highly crosslinked acrylic copolymer comprises, as sole monomer or as predominate monomer, MMA, that is to say that it comprises, by weight, more than 50%, advantageously more than 65% of MMA. The acrylic material according to the invention comprises from 60% to 99% by weight of matrix for 40% to 1% by weight of crosslinked copolymer. These materials may be converted by injection molding, extrusion, co-extrusion, extrusion-blow molding for producing parts, profiles, sheets or films for example.

19 Claims, No Drawings

IMPACT-REINFORCED ACRYLIC MATERIAL

This application claims benefit, under U.S.C. §119 or §365 of PCT Application Number PCT/FR201.2/050745, filed Apr. 7, 2012, and French Patent Application Number FR 11.01046, filed Apr. 7, 2011.

FIELD OF THE INVENTION

A subject matter of the present invention is a semi-rigid or flexible, low-gloss, impact-reinforced acrylic material. The low gloss of the material can be obtained by giving it a satiny or matt textured frosted appearance. This material comprises a matrix based on nanostructured acrylic block copolymer in which particles of highly crosslinked acrylic copolymers are dispersed. These particles are also sometimes referred to as beads when they are manufactured by a suspension polymerization process. The invention also relates to the use of said material in the manufacture of various articles having a soft touch and as coating on other materials.

BACKGROUND OF THE INVENTION

To date, acrylic materials having a frosted or matt appearance have always been obtained from PMMA, which PMMA may be slightly modified:
  either by introduction of impact modifiers having a flexible core/rigid shell structure;
  or by incorporation of comonomers, such as, for example, acrylates, which make it possible to improve the thermal stability, or acrylic or methacrylic acids, which make it possible to improve the temperature stability.

The document EP 1 022 115 describes extruded polymer articles having a matt appearance and a textured finish, comprising a PMMA-based matrix and highly crosslinked MMA-based polymer particles.

The document EP 2 089 473 describes the preparation of methacrylic compositions comprising an MMA homo- or copolymer in which particles of crosslinked MMA-based thermoplastic polymers are dispersed.

These materials are manufactured by dispersing crosslinked acrylic beads in a PMMA matrix in the molten state (compounding). The materials obtained scatter light while allowing it to pass (for example, shower stalls having a frosted appearance). They are also highly resistant to UV radiation. However, these materials have the disadvantage of being very rigid and of having a poor impact strength. Furthermore, the size of the crosslinked acrylic, beads directly influences the roughness of the final product.

The development of acrylic materials in the field of optical waveguides or of the coating of other materials is thus limited by the stiffness and brittleness of current materials.

It is therefore desirable to introduce novel properties to low-gloss acrylic materials by improving their impact strength or by manufacturing even "flexible" acrylic materials. This type of material can offer novel applications, for example in the field of design (illuminations) and coatings of materials.

To this end, a subject matter of the present invention, according to a first aspect, is a semirigid or flexible acrylic material comprising:
  a nanostructured matrix composed of at least one thermoplastic acrylic block copolymer,
  and at least one highly crosslinked acrylic copolymer.

This combination has the effect of resulting in a material which exhibits a group of novel properties since the material is simultaneously flexible, highly impact resistant, non glossy and resistant to UV radiation and has a surface which, unexpectedly, once processed, has a soft touch which is very pleasant and more or less pronounced according to the blend produced between a soft material (the nanostructured matrix) and another very hard material (the highly crosslinked acrylic copolymer).

These materials can be transformed by injection molding, extrusion, coextrusion or extrusion/blow molding for the preparation of parts, profiled elements, sheets or films, for example.

The product can advantageously be used as coating on other materials. For example, use may be made of the technique of coextrusion or lamination of film on a substrate. It is also possible to produce profiled elements which can be used, for example, in optical applications.

It is also possible to manufacture multilayer structures comprising a first layer consisting of the acrylic material according to the invention and a second layer comprising at least one substrate made of a thermoplastic polymer material.

The invention will now be described in detail.

The development of anionic polymerization and of controlled radical polymerization made it possible, towards the start of the 1990s, to synthesize acrylic block copolymers, for example diblocks of polymethyl methacrylate-polybutyl acrylate (PMMA-pBuA) or polymethyl methacrylate-polybutadiene type, or also triblocks of polymethyl methacrylate-polybutyl acrylate-polymethyl methacrylate or polystyrene-polybutadiene-polymethyl methacrylate type.

In comparison with random copolymers, block copolymers make it possible to obtain novel morphologies, with in particular organizations in domains of a few nanometers of the various phases formed by each of the blocks. These organizations are, for example, described in *Macromolecules*, Vol. 13, No. 6, 1980, pp. 1602-1617, or also in *Macromolecules*, vol. 39, No. 17, 2006, pp. 5804-5814. This type of organization is referred to as "nanostructured".

SUMMARY OF THE INVENTION

The invention relates, according to a first aspect, to a semirigid or flexible acrylic material comprising:
  a nanostructured matrix comprising at least one thermoplastic acrylic block copolymer,
  and at least one highly crosslinked acrylic copolymer.

Unexpectedly, the combination between a soft and tacky material and a crosslinked acrylic copolymer, and optionally an inorganic filler, confers, on the finished product obtained from this material, a unique group of properties, with in particular a specific surface roughness which gives a soft-touch effect. Compared with the standard high-impact PMMAs known from the prior art, the products according to the invention exhibit the advantage of also being very easy to process by virtue of their high melt flow.

DETAILED DESCRIPTION OF THE INVENTION

The matrix comprises at least one thermoplastic acrylic block copolymer. According to a first embodiment, said matrix is composed of at least one thermoplastic acrylic block copolymer having a general formula $(A)_nB$ in which:

n is an integer of greater than or equal to 1,

A is: an acrylic or methacrylic homo- or copolymer having a Tg of greater than 50° C., preferably of greater than 80° C., or polystyrene, or an acrylic/styrene or methacrylic/styrene copolymer. Preferably, A is methyl methacrylate, phenyl methacrylate, benzyl methacrylate or isobornyl methacrylate. Preferably, the block A is PMMA or PMMA modified with acrylic or methacrylic comonomers;

B is an acrylic or methacrylic homo- or copolymer having a Tg of less than 20° C., preferably consisting of methyl acrylate, ethyl acrylate, butyl acrylate, ethylhexyl acrylate or butyl methacrylate, more preferably butyl acrylate.

Furthermore, the blocks A and/or B can comprise other acrylic or methacrylic comonomers carrying various chemical function groups known to a person skilled in the art, for example acid, amide, amine, hydroxyl, epoxy or alkoxy functional groups. The block A can incorporate groups, such as acrylic acid or methacrylic acid, in order to increase the temperature stability of thereof.

Preferably, said matrix has a structure chosen from: ABA, AB, $A_3B$ and $A_4B$.

Preferably, the thermoplastic acrylic block copolymer is chosen from the following triblock copolymers: pMMA-pBuA-pMMA, p(MMAcoMAA)-pBuA-p(MMAcoMAA) and p(MMAcoAA)-pBuA-p(MMAcoAA). In a preferred embodiment, the block copolymer is of MAM type (PMMA-pBuA-PMMA).

It is known to a person skilled in the art that the polymers of PMMA type can comprise small amounts of acrylate comonomer in order to improve the temperature stability thereof.

The block B represents from 25% to 75% of the total weight of the block copolymer, preferably from 40% to 65%.

The block B has a weight-average molar mass of between 10 000 g/mol and 300 000 g/mol, preferably from 20 000 g/mol to 150 000 g/mol.

According to another embodiment, said matrix comprises, in addition to the thermoplastic acrylic block copolymer having a general formula $(A)_nB$ described above, at least one other thermoplastic polymer chosen from PMMAs, ABSs and TPUs. A particularly preferred matrix is a combination of MAM and PMMA, comprising, by weight, from 5% to 90% of PMMA, preferably from 10% to 50% and advantageously from 10% to 30% of PMMA.

The block copolymers participating in the composition of the matrix can be obtained by controlled radical polymerization (CRP) or by anionic polymerization; the most suitable process according to the type of copolymer to be manufactured will be chosen. Preferably, this will be CRP, in particular in the presence of nitroxides, for the block copolymers of $(A)_nB$ type and anionic or nitroxide radical polymerization, for the structures of ABA type, such as the triblock copolymer MAM.

Said acrylic matrix additionally comprises at least one crosslinked acrylic copolymer.

The particles of highly crosslinked acrylic copolymer are prepared by suspension polymerization, in particular by radical suspension polymerization, and exert a spherical or substantially spherical shape. This preparation process makes it possible to control the size of the particles and their shape and to ensure a narrow distribution in their sizes.

The highly crosslinked acrylic copolymer comprises, as sole monomer or as predominant monomer, MMA that is to say that it comprises, by weight, more than 50%, advantageously more than 65%, of MMA. Said acrylic copolymer is thus either a PMMA or a copolymer of MMA and of at least one comonomer which can copolymerize by the radical route with MMA. The comonomer can be a vinyl aromatic, such as styrene or alpha-methylstyrene, and/or a (meth) acrylic monomer. The content of comonomer, when it is present, reaches at most 50% of the weight of the acrylic copolymer.

Crosslinking is obtained by using at least one crosslinking agent which can be, for example, an allyl (meth)acrylate, divinylbenzene, or a di- or trimethacrylate such as polyethylene glycol dimethacrylate. The particles of acrylic copolymer are highly crosslinked, so as to retain their integrity during the compounding with the acrylic matrix. The term "highly crosslinked" means here that the particles of acrylic copolymer are insoluble in a polar solvent, such as tetrahydrofuran or methylene chloride.

The content by weight of crosslinking monomer in the acrylic copolymer is at least 0.5%, preferably greater than 0.8% and ranging up to 2.5% of the weight of said copolymer.

The particles of highly crosslinked acrylic copolymer have a mean size of between 10 and 500 micrometers, preferably between 10 and 70 microns, measured according to the ASTM D 1921 method. These particles can consist either of individual grains which will retain their integrity during the dispersion in the matrix of block acrylic copolymer or of agglomerates of elementary grains which will be divided down to this elementary size during the processing. This elementary size is, for example, identifiable by microscopic techniques on the starting particles or on the final material. The size of these elementary grains can vary from 1 to 100 μm, preferably from 3 to 50 μm.

Said at least, one highly crosslinked acrylic copolymer consists of particles of polymers comprising, by weight: 0-50% comonomer(s), 99.9-50% MMA and 0.1-2.5% crosslinking agent.

The acrylic, material according to the invention comprises, by weight, from 60% to 99%, advantageously from 70% to 97% and preferably from 75% to 90% of matrix, for from 40% to 1%, advantageously from 30% to 3% and preferably from 10% to 25% of highly crosslinked acrylic copolymer.

This material is obtained by dispersing the highly crosslinked acrylic beads in said nanostructured matrix in the molten state (compounding). This stage can be carried out by the techniques known to a person skilled in the art for manufacturing thermoplastic compounds, for example use of an internal mixer, single-screw or twin-screw extrusion, or calendaring.

The weakly glossy appearance of the material according to the invention can be characterized by the gloss of its surface. The less the incident rays are reflected parallel to one another, the less glossy a material. When the incident rays are reflected in all directions, the surface appearance is matt, indeed even frosted. The acrylic material according to the invention exhibits a gloss of less than 20, preferably of less than 10, measured under an angle of 60°.

For a given process and processing conditions, and for a given blend, the appearance of the acrylic material according to the invention depends on the size and on the type of particles and on the composition of the block copolymer.

Thus, regarding the flexibility, the richer the acrylic copolymer in block B, or the richer a PMMA/block acrylic copolymer blend in block acrylic copolymer, the more flexible the material. As regards the roughness and thus the "touch" aspect, the larger the particles of highly crosslinked acrylic copolymer, and/or the richer the block copolymer in acrylic or methacrylic homo- or copolymer having a Tg of less than 20° C., the more the material according to the invention will exhibit a high surface roughness.

The material according to the invention exhibits a translucent and matt appearance when the elementary grains of the particles of highly crosslinked acrylic copolymer have sizes ranging from 1 to 40 μm, preferably from 3 to 30 μm and more preferably from 10 to 25 μm. The material according to the invention exhibits a translucent and frosted appearance when the particles of highly crosslinked acrylic copolymer have sizes ranging from 40 to 70 µm, preferably from 45 to 55 µm, and the refractive indices of the particles of the acrylic copolymer and of the block copolymer differ at 20° C. by more than 0.02 units. These indices are measured by means of the ISO 489 test.

The acrylic material according to the invention can additionally comprise an inorganic filler chosen from silica, talc, kaolin, calcium carbonate, carbon black, titanium oxides, and also the pigments used to color the material. Nevertheless, the inorganic fillers often cause strong opacification and thus the use of inorganic fillers will be avoided when it is desired to retain a degree of (contact) transparency in the material according to the invention.

The abovementioned base components can be supplemented by other additives suited to the nanostructured PMMA matrix concerned. These additives can be antioxidants, heat stabilizers, light stabilizers, plasticizers, UV absorbers or antistatics. It is not ruled out for the additive to be a polymer, such as, for example, PVDF or a copolymer comprising polyether/polyamide blocks of the PEBAX type. The additive can in particular be at least one acrylic copolymer which comprises from 20% to 80% of MMA, from 80% to 20% of BMA and from 0% to 15% of MAA or AA. Preferably, this acrylic copolymer is composed of from 50% to 80% of MMA and from 5% to 20% of BMA. This acrylic copolymer has a molecular weight of between 40 000 and 300 000 and preferably between 40 000 and 100 000. When the acrylic copolymer is added to the composition, the material according to the invention then comprises, by weight, from 5% to 40% of acrylic copolymer, preferably from 5% to 20%, for from 3% to 30%, preferably from 10% to 25%, of highly crosslinked acrylic copolymer and for from 92% to 30%, preferably from 85% to 55%, of matrix composed of nanostructured acrylic block copolymer. The acrylic copolymer will preferably be added to the composition in order to improve the adhesion of said composition to styrene substrates, such as crystal PS (polystyrene homopolymer) or high-impact PS or a blend of these 2 types of PS. High-impact PS is understood to mean a PS reinforced with regard to impacts by the addition of rubber, such as the polybutadiene or EPDM, winch is found dispersed in the PS matrix in the form of particles commonly referred to as nodules.

Advantageously, the acrylic material according to the invention exhibits a semirigid, indeed even flexible, nature while retaining a very good impact strength and a very good resistance to UV radiation. In the context of the present invention, a semirigid material is characterized by a flexural modulus ranging from 500 MPa to less than 1800 MPa, preferably of less than 1500 MPa, whereas a flexible material exhibits a flexural modulus of 10 to less than 500 MPa, measured according to the ISO 178 standard.

The acrylic material according to the invention is also characterized by a notched Charpy impact strength of at least 6 kJ/m$^2$, as measured according to the standard EN ISO 179-1 at 23° C.

These materials can be transformed by injection molding, extrusion, coextrusion or extrusion/blow molding for the preparation of parts, profiled elements, sheets, panels or films, for example.

The product can advantageously be used as coating on other materials. For example, the technique for coextrusion or lamination of film on a substrate can be used. It is also possible to produce profiled elements which can be used, for example, in optical applications.

It is also possible to manufacture multilayer structures comprising a first layer consisting of the acrylic material according to the invention and a second layer comprising at least one substrate made of a thermoplastic polymer material. In these structures, the material according to the invention represents from 1% to 20%, preferably from 2% to 15%, of the total thickness.

When the materials according to the invention are coextruded or laminated over a substrate, the latter can, for example, be a saturated polyester, such as polyethylene terephthalate PET or PETg or polybutylene terephthalate PBT, ABS (acrylonitrile/butadiene/styreneterpolymer), SAN (styrene/acrylonitrile copolymer), ASA (acrylic/styrene/acrylonitrile copolymer), a polystyrene PS (crystal or high-impact), TPOs (thermoplastic polyolefins), polypropylene (PP), polyethylene (PE), polycarbonate (PC), polyphenylene oxide PPO, a polysulfone, a polymer of vinyl chloride, such as PVC, chlorinated PVC (CPVC) or expanded PVC, PU, TPUs, polyacetals or PMMA, which is or is not high-impact PMMA. It can also be a blend of two or more thermoplastic polymers from the above list. For example, it can be a PPO/PS or PC/ABS blend. When the substrate is a crystal or high-impact PS, the materials according to the invention can advantageously comprise, as additive, from 5% to 40% of acrylic copolymer composed of 20% to 80% of MMA, 20% to 80% of BMA and 0% to 15% of MAA or AA.

A layer of another polymer can be present between the substrate and the products according to the invention in order to improve the adhesion, in particular in the case of the substrates made of crystal or high-impact PS, TPO and PO.

The invention will now be illustrated by implementational examples which do not limit the scope of the invention.

IMPLEMENTATIONAL EXAMPLES

Low-gloss systems were prepared from the copolymers and procedures described below.

Example 1

Polymers and Copolymers

TABLE 1

| Matrix | Structure | % of flexible phase (PBuA phase) | Number-average molecular weight of the PBuA block | Weight-average molecular weight of the PBuA block | Flexural modulus of the polymer (ISO 527 1A) |
| --- | --- | --- | --- | --- | --- |
| Nanostrength M53 | PMMA-PBuA-PMMA | 50 | 31 000 | 55 000 | 270 |
| Nanostrength SM5590 | PMMA-PBuA-PMMA | 55 | 63 000 | 112 000 | 35 |

The nanostructured acrylic block copolymers were obtained by controlled radical polymerization using Blocbuilder® MA, an alkoxyamine sold by Arkema. The copolymers exhibit a refractive index of between 1.48 and 1.485, depending on the composition of the copolymer.

The beads of highly crosslinked acrylic copolymer used are products sold by Altuglas International, under the references BS110 and BS130. The bead BS130 exhibits a mean size of 20 μm, 90% of the particles have a size of less than 30 μm and exhibit a refractive index of 1.49. The bead BS110 exhibits a mean size of between 35 and 60 μm and exhibits a refractive index of 1.52. They are particles in the form of single grains and not of agglomerates of finer grains.

Example 2

Preparation of Blends or Compounds Comprising Block Acrylic Copolymers and Beads of Highly Crosslinked Copolymer The compositions based on block copolymers and cross-linked beads or inorganic filler as described in table 2 were obtained by introducing granules in the desired proportion into a Werner 40 extruder. The temperature is 200° C.

In this table:
the terms "PMMA-1" and "PMMA-2" correspond to PMMAs sold by Altuglas International under the references DRT and HFI-10 respectively;
the parameter "MFI" corresponds to the melt flow index (ISO 1133), 230° C./3.8 kg, g/10 min;
tensile strength (ISO 527-2), 23° C. (MPa);
tensile elongation at break (ISO 527-2) 23° C. (%);
flexural modulus (ISO 178), 23° C. (MPa);
notched Charpy impact strength (ISO 179-1eU), 23° C. (kJ/m$^2$);
luminous transmittance (ASTM D-1003) (%);
haze (ASTM-D1003) (%);
Vicat softening temperature (VST-50) (ISO 306), 50 N (° C.);
Vicat softening temperature (VST-10) (ISO 306), 10 N (° C.);
heat deflection temperature HDT (ISO 75-2), 1.80 MPa (° C.);
arithmetic mean roughness, measured using a Dektak 8 mechanical profilometer from Veeco;
the refractive index: ISO 489;
the 60° gloss: ASTM D523.

Example 3

Preparation of Extruded Films

The granules obtained after compounding are introduced into an Andouart brand extruder, with a diameter of 40 mm. The films with a thickness of approximately 300 μm are extruded at a temperature of 200° C. for all the formulations based on MAM block acrylic copolymers and at 230° C. for the others.

Example 4

Characteristics of the Granules and Extruded Films

The characteristics obtained are given in table 2 below.

It may be noted that the products of examples 1A, 1B, 2A and 2B all have much higher flexibilities than the modified PMMA of counterexamples 1C and 2C (lower values for moduli). Furthermore, the MAMs having a weakly glossy appearance also have a much better impact strength than the satiny or matt PMMA.

The light scattering effect is illustrated by the high haze values.

The soft-touch effect is obtained by the combination of the lower moduli and of the roughness conferred at the surface.

TABLE 2

| | Example 1A | Example 1B | Counter-example 1 | Example 2A | Example 2B | Counter-example 2 | Counter-example 3 | Counter-example 4 | Counter-example 5 | Counter-example 6 |
|---|---|---|---|---|---|---|---|---|---|---|
| Composition | | | | | | | | | | |
| Nanostrength M53 | 82 | | | 85 | | 100 | | | | |
| Nanostrength SM5590 | | 82 | | | 85 | | 100 | | | |
| PMMA-1 | | | 82 | | | | | 100 | | |
| PMMA-2 | | | | | | 80 | | | | 100 |
| Altuglas BS110 | 18 | 18 | 18 | | | | | | | |
| Altuglas BS130 | | | | 15 | 15 | 20 | | | | |
| MFI | 5.7 | 2 | 0.7 | 4.2 | 2.2 | 1.7 | 7 | 1.6 | 0.8 | 3 |
| Tensile strength | 9 | 5 | 38 | 10 | 2 | 50 | 7.3 | 5.7 | 38 | 38 |
| Elongation at break | 45 | 30 | 35 | 35 | 45 | 15 | 90 | 75 | 40 | 30 |
| Flexural modulus | 650 | 380 | 1900 | 1000 | 400 | 1900 | 270 | 32 | 1700 | 1700 |
| Notched Charpy impact strength | 10.8 | 18.5 | 5.5 | 7 | 19 | 3.5 | 35 | Unbroken | 6.3 | 5 |
| Luminous transmittance | 74 | 74 | 88 | 60 | 75 | 90 | ** | ** | 90 | 90 |
| Haze (%) | 100 | 100 | 100 | 98 | 98 | | ** | ** | 2 | 2 |
| VST-50 | 38 | 28 | 101 | 40 | 28 | 93 | <23 | <23 | 100 | 90 |
| VST-10 | 79 | 72 | | 83 | 61 | | <23 | <23 | | |
| HDT (ISO 75-2) | | 48 | 88 | 63 | 44 | | | | 88 | 81 |
| Surface roughness—1 (nm) | 10 462 | 11 350 | 8543 | 5190 | 5756 | 4205 | 76 | 435 | 25 | 22 |
| Surface roughness—2 (nm) | 10 382 | 11 664 | 7906 | 5358 | 5276 | 4026 | 333 | 482 | 30 | 25 |
| 60° Gloss, measured on extruded film (GU) | 4 | 5 | 5 | 7 | 7 | 7 | | | | |
| Soft touch | Yes | Yes | No | Yes | Yes | No | No | No | No | No |

Example 5

Preparation of Blends or Compounds and of Films Comprising Block Acrylic Copolymers, Beads of Highly Crosslinked Copolymer and an Acrylic Copolymer A blend consisting of 72% of Nanostrength M53, 18% of BS110 beads and 10% of a copolymer comprising 60% of MMA and 40% of BMA is introduced into a Werner 40 extruder heated to 200° C. The granules obtained are subsequently introduced into an Andouart brand extruder, with a diameter of 40 mm. The film with a thickness of approximately 300 μm is extruded at a temperature of 200° C.

Example 6

Tests of Adhesion of Extruded Film to a Substrate of PS Type 85 g of high-impact PS granules, reference 7240, sold by Total Petrochemicals, are introduced into a frame with a thickness of 3 mm in a Darragon press preheated to 200° C. The granules are subsequently maintained in the press at 200° C. under a pressure of 200 bar for 2 minutes, in order to manufacture a sheet with a thickness of approximately 3 mm.

In a second stage, the film extruded according to example 1A of table 2 (namely a film comprising block acrylic copolymers and beads of highly crosslinked copolymer) is cut to the dimensions corresponding to the frame of the press and placed on the sheet of high-impact PS, and the structure is maintained in the press at 200° C. under a pressure of 200 bar for 2 minutes. Once the structure has cooled, an attempt is made to manually peel the extruded film and it is found that the latter very easily becomes detached, which is a sign of very poor adhesion of the film to the PS sheet.

The same procedure as above is reproduced but using the extruded film obtained in accordance with example 5 above, namely a film consisting of block acrylic copolymers, beads of highly crosslinked copolymer and an acrylic copolymer. An attempt is made to manually peel the extruded film and it is found that it is impossible to detach it, which is a sign of very good adhesion between the film and the PS sheet.

ABBREVIATIONS

Tg—glass transition temperature of a polymer, measured by DSC according to the standard ASTM E1356
DSC—differential scanning calorimetry
PMMA or pMMA—polymethyl methacrylate
MMA—methyl methacrylate
PBuA or pBuA—polybutyl acrylate
MAM—pMMA-pBuA-pMMA triblock copolymer
MAA—methacrylic acid
AA—acrylic acid
BMA—butyl methacrylate
EPDM—ethylene/propylene/diene monomer
ABS—acrylonitrile/butadiene/styrene terpolymer
TPU—thermoplastic polyurethane
PU—polyurethane
PS—polystyrene
PVC—polyvinyl chloride
TPO—thermoplastic pofyolefins
PO—polyolefins
PE—polyethylene
PP—polypropylene
PC—polycarbonate
MFI—melt flow index
VST—Vicat softening temperature
HDT—heat deflection temperature
GU—gloss units
PVDF—poly vinylidene fluoride
PET—polyethylene terephthalate
PETg—polyethylene terephthalate glycol-modified
PBT—polybutylene terephthalate
SAN—styrene/acrylonitrile copolymer
ASA—acrylic/styrene/acrylonitrile block copolymer
PPO—poly(2,6-dimethylphenylene oxide)
CPVC—chlorinated PVC

The invention claimed is:

1. An acrylic material comprising:
    a matrix composed of at least one nanostructured thermoplastic acrylic block copolymer, having a general formula $(A)_nB$ in which:
        n is an integer of greater than or equal to 1,
        A is: an acrylic or methacrylic homo- or copolymer having a Tg of greater than 50° C., polystyrene, an acrylic/styrene copolymer or methacrylic/styrene copolymer,
        B is an acrylic or methacrylic homo- or copolymer having a Tg of less than 20° C.
    and at least one highly crosslinked acrylic copolymer.

2. The material as claimed in claim 1, additionally comprising an inorganic filler chosen from silica, talc, kaolin, calcium carbonate, carbon black, titanium oxides and pigments.

3. The material as claimed in claim 1 comprising, by weight, from 60% to 99% of matrix for from 40% to 1% of highly crosslinked copolymer.

4. The material as claimed in claim 1, in which the block A is polymethyl methacrylate, polyphenyl methacrylate, benzyl polybenzyl methacrylate or polyisobronyl methacrylate.

5. The material as claimed in claim 1, in which the block A is polymethylmethacrylate (PMMA) or PMMA modified with acrylic or methacrylic comonomers.

6. The material as claimed in claim 1, in which said matrix comprises, in addition to the thermoplastic acrylic block copolymer, at least one other thermoplastic polymer chosen from PMMAs, acrylonitrile/butadiene/styrene (ABS) and thermoplastic polyurethane (TPU).

7. The material as claimed in claim 1, in which the thermoplastic acrylic block copolymer is chosen from the following triblock copolymers: polymethyl methacrylate/polybutyl acrylate/polymethyl methacrylate (pMMA-pBuA-pMMA), poly(methyl methacrylate-co-methacrylic acid)/polybutyl acrylate/poly(methyl methacrylate-co-methacrylic acid) (p(MMAcoMAA)-pBuA-p(MMAcoMAA)) and poly(methyl methacrylate-co-acrylic acid)/polybutyl acrylate/poly(methyl methacrylate-co-acrylic acid) (p(MMAcoAA)-pBuA-p(MMAcoAA)).

8. The material as claimed in claim 7, additionally comprising at least one acrylic polymer additive consisting of from 20% to 80% of methyl (MMA), from 20% to 80% of butyl methacrylate (BMA) and from 0% to 15% of methacrylic acid (MAA) or acrylic acid (AA), and having a weight-average molecular weight of between 40 000 and 100 000 g/mol.

9. The material as claimed in claim 8, consisting, by weight, of 5% to 40% of acrylic copolymer, from 3% to 30% of highly crosslinked acrylic copolymer and for from 92% to 30% of nanostructured matrix.

10. The material as claimed in claim 7, in which said at least one highly crosslinked acrylic copolymer consists of particles of polymers having a mean size of between 10 and 70 microns and comprising by weight: 99.9%-50% of MMA, 0%-50% of comonomer which can copolymerize by the radical route with the MMA and 0.1%-2.5% of cross-linking agent.

11. The material as claimed in claim 10, exhibiting a gloss of less than 20 measured under an angle of 60°.

12. The material as claimed in claim 10, exhibiting a flexural modulus ranging from 500 MPa to less than 1800 MPa and a notched Charpy impact strength of at least 6 kJ/m$^2$, as measured according to the standard EN ISO 179-1 at 23° C.

13. The material as claimed in claim 10, exhibiting a translucent and frosted appearance when the particles of highly crosslinked acrylic copolymer have mean sizes ranging from 40 to 70 microns, and the refractive indices of the particles of the acrylic copolymer and of the block copolymer differ at 20° C. by more than 0.02 units.

14. The material as claimed in claim 10, exhibiting a translucent and matt appearance when the elementary grains of the particles of highly crosslinked acrylic copolymer have sizes ranging from 1 to 40 μm.

15. An article comprising an acrylic material as claimed in claim said article being in the form of a film, part, profiled element, sheet or panel.

16. A process for the manufacture of an article as claimed in claim 15, comprising an operation chosen from: injection molding, extrusion, coextrusion or extrusion/blow molding.

17. A multilayer structure comprising a first layer consisting of the material as claimed in claim 1 and a second layer comprising at least one substrate made of a thermoplastic polymer material.

18. The multilayer structure as claimed in claim 17, in which the material according to the invention represents from 1% to 20% of the total thickness.

19. The multilayer structure as claimed in claim 17, in which said substrate comprises at least one thermoplastic polymer selected from the group consisting of: PMMA, which is or is not high-impact, saturated polyesters, polyethylene terephthalate (PET), polyethylene terephthalate glycol-modified (PETg), polybutylene terephthalate (PBT), acrylonitrile/butadiene/styrene terpolymer (ABS), styrene/acrylonitrile copolymer (SAN), acrylic/styrene/acrylonitrile block copolymer (ASA), crystal or high-impact polystyrene (PS), polypropylene, polyethylene, polycarbonate, poly(2,6-dimethylphenylene oxide) (PPO), thermoplastic olefins (TPOs), polysulfones, polymers based on vinyl chloride, polyvinyl chloride (PVC), chlorinated polyvinyl chloride (CPVC), expanded PVC, polyurethane (PU), thermoplastic polyurethane (TPU) and polyacetals.

* * * * *